United States Patent [19]

Lesh et al.

[11] Patent Number: 5,517,016
[45] Date of Patent: May 14, 1996

[54] LASERCOM SYSTEM ARCHITECTURE WITH REDUCED COMPLEXITY

[75] Inventors: James R. Lesh, Arcadia; Chien-Chung Chen, San Gabriel; Homayoon Ansari, Los Angeles, all of Calif.

[73] Assignee: The United States of America as represented by the Administrator of the National Aeronautics and Space Administration, Washington, D.C.

[21] Appl. No.: 223,938

[22] Filed: Mar. 31, 1994

[51] Int. Cl.⁶ .............................. G01J 1/20; G01B 11/26
[52] U.S. Cl. ................... 250/201.1; 250/206.2; 356/152.2; 359/170
[58] Field of Search ............................ 250/201.1, 206.2, 250/203.2; 356/152.2, 153; 359/170, 181

[56] References Cited

U.S. PATENT DOCUMENTS

| | | | |
|---|---|---|---|
| 3,566,126 | 2/1971 | Lang et al. | 359/170 |
| 3,989,942 | 11/1976 | Waddoups | 250/203.3 |
| 4,243,877 | 1/1981 | Cruz | 250/206.2 |
| 4,583,852 | 4/1986 | Cassidy et al. | 356/152.2 |
| 4,653,911 | 3/1987 | Fortin | 356/153 |
| 5,142,400 | 8/1992 | Solinsky | 359/159 |

*Primary Examiner*—Stephone Allen
*Attorney, Agent, or Firm*—John H. Kusmiss

[57] ABSTRACT

Spatial acquisition and precision beam pointing functions are critical to spaceborne laser communication systems. In the present invention a single high bandwidth CCD detector is used to perform both spatial acquisition and tracking functions. Compared to previous lasercom hardware design, the array tracking concept offers reduced system complexity by reducing the number of optical elements in the design. Specifically, the design requires only one detector and one beam steering mechanism. It also provides means to optically close the point-ahead control loop. The technology required for high bandwidth array tracking was examined and shown to be consistent with current state of the art. The single detector design can lead to a significantly reduced system complexity and a lower system cost.

15 Claims, 5 Drawing Sheets

LASERCOM SYSTEM ARCHITECTURE WITH REDUCED COMPLEXITY

ORIGIN OF INVENTION

The invention described herein was made in the performance of work under a NASA contract, and is subject to the provisions of Public Law 96-517 (35 USC 202) in which the Contractor has elected not to retain title.

TECHNICAL FIELD

The present invention relates to a method and apparatus for reducing the number of optical elements required in conventional laser communications (lasercom) systems designs and at the same time, provides for optical feedback for point-ahead compensation; spatial acquisition and tracking functionality; and platform jitter compensation.

BACKGROUND ART

Laser communication technology can improve the performance of space communication systems by offering higher carrier frequency and information bandwidth. The small beam divergence resulting from the short operating wavelength can also lead to an improved channel security and, more importantly, can permit communication systems to use a smaller aperture antenna while providing increased channel throughput compared to radio frequency systems. The resulting reduction in size and mass of the communication system can lead to an increased payload capacity for the host spacecraft.

For planetary missions, the reduction in communications system size can also lead to a simplified spacecraft design. The large RF antenna currently used by communication systems can restrict the field-of-view of scientific instruments. It also imposes constraints on the attitude control of the spacecraft because the antenna must be kept pointed at the receiving site. In contrast, a smaller optical communications instrument can be articulated independent of the spacecraft attitude, and can permit more options for spacecraft control. A smaller communications package also eliminates the need for an unfurlable antenna and a large scan platform boom, thereby simplifying the spacecraft design. In some cases, the reduction in size can also permit a wider diversity of launch vehicle options. Smaller spacecraft currently being proposed for the planetary and space physics missions, such as the Explorer and Discovery-class spacecraft, will impose stringent demands on the communication system. For these missions, laser communication technology offers an attractive method of providing increased data throughput while at the same time decreasing the mass and size of the communications subsystem. Additionally, lasercom technology can be applied to near-Earth space communication systems. The high information bandwidth of the optical channel can permit intersatellite crosslinks to operate at data rates in excess of several hundred megabits per second while at the same time offering improved channel security and decreasing the dependency on foreign ground tracking stations.

The narrow transmit beamwidth of the lasercom system, on the other hand, can impose stringent demands on the pointing control accuracy of the instrument. Inaccurate beam pointing can result in large signal fades at the receiving site and a severely degraded system performance. Since the uncertainty in the spacecraft attitude is much larger than the beamwidth, an initial acquisition process needs to be performed to acquire the receiver location. Furthermore, since the spacecraft attitude errors due to deadband cycle and random platform jitter are also much larger than the transmit beamwidth, a dedicated pointing control subsystem is required to reduce the signal loss due to pointing error. Such a subsystem must be capable of tracking the receiving station such that the residual pointing error is less than approximately 20% of the diffraction-limited beamwidth.

The required pointing acquisition and tracking subsystems for laser communication instruments have been developed and tested for several systems in various stages of flight readiness. However, these previous subsystem designs tend to be very complex as the designs generally employ decade-old technology. For example, two separate detectors are required for spatial acquisition and tracking, and two beam steering mechanisms are required for line-of-sight stabilization and point-ahead compensation. Because of the design complexity, extensive efforts were required to ensure functionality and to achieve the desired reliability. As a result, these systems tend to be very costly and, in some cases, more massive than comparable RF technologies.

The conventional design approach is to sense the beacon line-of-sight jitter using a high speed tracking detector and to control said jitter using a high-bandwidth steering mirror. This design approach does indeed stabilize the beacon line-of-sight, but unfortunately requires a separate beam steering mirror to provide the point-ahead angle in order to compensate for the relative motion between transmit and receive systems. Furthermore, a wide field-of-view acquisition detector is generally required to permit initial signal acquisition. The complexity of this conventional design approach has led to higher development costs for lasercom systems.

STATEMENT OF THE INVENTION

Recent advances in high speed focal plane array technology permit a single detector array to perform the high bandwidth angular determination required for jitter tracking. By designing the optics to image both the beacon and a portion of the transmit signal, a single detector can be used to calculate the compensation signal for the beam-steering mirror to suppress platform jitter. The present invention relates to the use of CCD arrays in spatial tracking applications. By offering considerable design simplification, the CCD-based tracking concept can result in a reduced hardware complexity and hence a lower implementation cost for future flight lasercom systems.

Recently, with the development of high bandwidth, large format array detectors, it has become possible to implement space laser communication systems using a single array detector for both spatial acquisition and tracking. A large format detector can also permit direct tracking of the point-ahead angle, i.e., the transmit signal pointing can be maintained by measuring the instantaneous point-ahead angle and stabilizing it to the desired value. Since there is no need to stabilize the receiver line-of-sight, only one steering mirror is required to maintain the pointing stability and to compensate for the point-ahead angle. By reducing the number of detectors and steering mirrors, the optical design can also be simplified as a smaller number of optical relay elements are required to relay the pupil planes.

OBJECTS OF THE INVENTION

It is therefore a principal object of the present invention to provide a precision beam pointing system for a laser communication system by using a CCD-based tracker.

It is another object of the invention to provide a laser communication system which utilizes only one beam steering element to perform platform jitter compensation and point-ahead functions.

It is still an additional object of the invention to provide a laser communication system which utilizes only one detector to perform spatial acquisition and tracking functions.

It is still an additional object of the invention to provide a laser communication system having optical feedback for point ahead compensation.

It is still an additional object of the invention to reduce the number of optical elements in a laser communication system.

BRIEF DESCRIPTION OF THE DRAWINGS

The aforementioned objects and advantages of the present invention as well as additional objects and advantages thereof will be more fully understood hereinafter as a result of a detailed description of a preferred embodiment when taken in conjunction with the following drawings in which.

DETAILED DESCRIPTION OF THE INVENTION

A spaceborne laser communication system generally performs four major functions: (a) delivers a collimated optical signal which is modulated by the transmit data stream; (b) acquires a remote beacon signal and orients the system line-of-sight; (c) tracks the beacon signal in order to maintain the transmit signal on target; and (d) receives, detects, and demodulates the optical signal sent from the remote terminal. Among these, the spatial acquisition and tracking functions have long been regarded as the most difficult aspects of the lasercom system design.

In order to achieve the desired pointing accuracy, an auxiliary pointing sensor and a beam steering mechanism to compensate for platform vibration must be integral parts of the lasercom instrument design. Sensing of pointing error is typically accomplished with the aid of a beacon signal from the receiving site. The beacon signal defines a directional reference from which any deviation produced by the platform disturbance can be referenced. This beacon direction and the relative velocity vector between the transmit and receive platforms define the desired direction to transmit the downlink signal. By sensing the deviation from this desired pointing angle and feeding back the error signal to the beam steering elements, the lasercom system can stabilize the pointing even if the platform jitter is several times larger than the required pointing accuracy.

Figure 1:
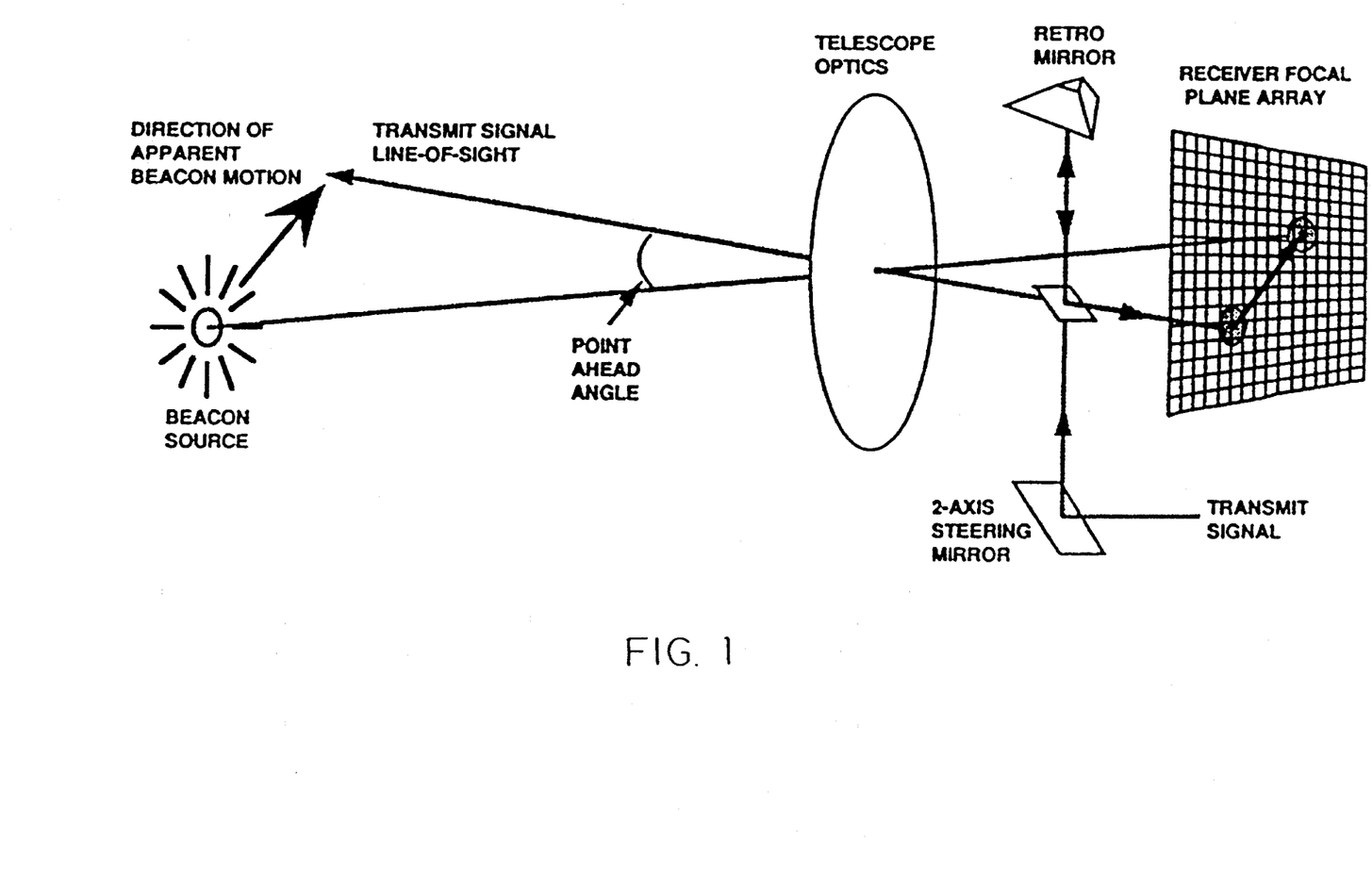
FIG. 1 is a conceptual diagram of an array-based, spatial tracking system using a single array detector.

A conceptual diagram of the array-based tracking system of the present invention is shown in FIG. 1. A remote beacon laser is imaged by the telescope optics onto the focal plane array. By reading out the area of the detector containing the beacon signal and calculating the image centroid, the angular direction of the beacon can be accurately deduced relative to the optical axis of the system. A small amount of the transmit signal can also be imaged onto the acquisition detector and the location of the transmit signal can be measured relative to the optical axis. The distance between the two image spots in the focal plane is a direct measure of the relative angular offset between the transmit and beacon signals. By sensing any difference between this measured, instantaneous point-ahead angle and the desired point-ahead value, the instrument can derive a real time control signal to maintain the pointing of the transmit signal on target.

The actual beam steering control is achieved using a nested control loop. The measured platform disturbance is fed back to a fast steering mirror in the optical path. The fast steering mirror compensates for the high frequency, small amplitude disturbances. A slow gimbal control loop then removes the bias and maintains the steering mirror at the middle of its dynamic range. Large amplitude disturbances such as the dead band cycle of the spacecraft are also removed using the coarse pointing gimbal. Additionally, the gimbal is used to orient the instrument line-of-sight during initial acquisition.

Instead of stabilizing receive and transmit lines-of-sights individually, the array detector-based tracking concept of the present invention requires only the relative angle between the transmit and receive beams to be stabilized. As a result, only one steering mirror is required to close the pointing control loop. In contrast, previous designs of lasercom systems generally achieved the desired pointing accuracy by using a directionally sensitive detector such as a quadrant avalanche photodiode (QAPD) to measure the angular error between the detector line-of-sight and the beacon direction. The error was then fed back to a high bandwidth steering mirror to stabilize the detector line-of-sight along the beacon direction. A second point-ahead mirror in the transmit beam path was then used to provide the required pointing offset between the transmit and receive signals. Since the quadrant detector has a limited field-of-view, a separate, larger format detector was usually required to provide the wide field-of-view coverage during the acquisition process. Furthermore, additional optical relay elements were required to channel the optical signals between the steering mirrors and the detectors.

In addition to simplifying the optical design, the array detector-based pointing control concept of the present invention also has the advantage over conventional quadrant-detector based tracking systems in that a direct optical feedback for the point-ahead angle is available to the control loop, thus eliminating the need for additional sensors to measure the point-ahead angle. This helps eliminate the need for careful boresight alignment.

The large format array detector required for high bandwidth tracking can be implemented using either a charge coupled device (CCD) or a charge injection device (CID). The CIDs offer direct pixel addressing. However, the CID technology is less mature and the devices are not as readily available. At the same time, recent advances in CCD fabrication technology have resulted in high readout rate devices with high quantum efficiency and no dark zones. For these reasons, the CCD is chosen for implementation in the preferred embodiment.

In order to effectively acquire the remote beacon in the presence of initial attitude uncertainty of the host spacecraft, the acquisition detector array must possess a sufficiently large field-of-view to cover the uncertainty zone. For modern spacecraft, this is typically on the order of ±1 mrad. At the same time, the pixel resolution of the CCD must be sufficiently fine such that the error in position information derived from the CCD is small compared to the desired pointing accuracy. For a 10 cm transmit aperture system, the required pointing accuracy is on the order of 2 μrad. If the centroid algorithm can provide 1/10 pixel resolution, then the CCD format needs to be greater than 100×100 to cover the required field-of-view.

In order to operate the CCD in the tracking mode, it is desirable that the readout time of the device be small compared to the integration time such that the effect of image blurring due to vertical transfer is limited. Furthermore, it is desirable to operate frame transfer/image storage devices such that the readout can be carried out independent of image integration. Finally, in order to achieve the desired tracking control accuracy, the centroid positions must be updated at a sufficiently high rate such that the image movement in between updates is small compared to the desired pointing accuracy. For tracking a ground-based station from a space-based laser transmitter, the required image centroid update rate should be in excess of 2 kHz.

Figure 2:
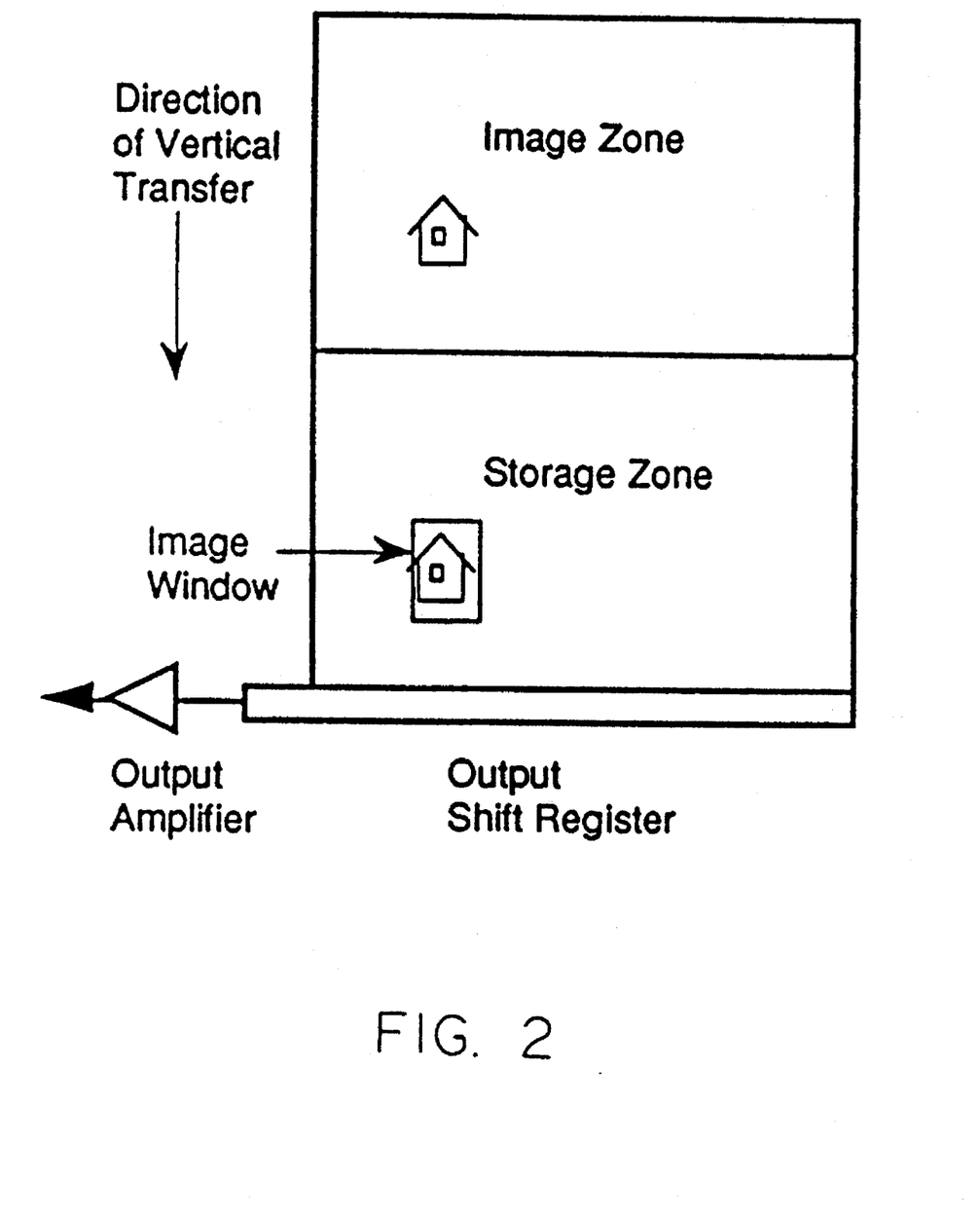
FIG. 2 is an illustration of a high speed windowed read algorithm for an image transfer CCD used in the invention.

Conventional CCD imaging systems read out every pixel in the detector. The maximum vertical and horizontal transfer clock speed is typically on the order of 5–10 MHz. The actual pixel readout rate is a function of the desired read noise level. A slower read speed can result in a lower effective noise level whereas a higher readout rate generally implies a larger readout noise. Because of the large number of individual pixels in an array detector, a detector with the required field-of-view and pixel resolution will generally have a relatively slow frame read speed. For example, with 5 MHz vertical and horizontal transfer rates, a 100×100 detector can be read out no faster than every 2 ms. This frame rate (500 Hz) is far below what would be required for effective platform jitter compensation. An alternative is to read out only a portion of the pixels that are critical to the tracking, namely the areas around the beacon and transmit laser spots. This alternative is illustrated in FIG. 2. At the beginning of the read cycle, the image zone is transferred into the storage zone such that integration can be conducted independent of the subsequent image readout. A "windowed" read operation can then be performed by clocking the vertical transfer lines of the CCD such that only the lines containing the areas of interest will be read on a pixel-by-pixel basis; whereas other lines will be skipped without being read. Shown in FIG. 2 is an illustration of this high speed clocking concept.

As shown in FIG. 2, the image is first transferred into a storage zone. Then, a rapid vertical transfer occurs until the first line of the window is in a horizontal shift register. Rapid horizontal transfer of the image then occurs until the first pixel to be read is at the output gate. The desired number of pixels in a line is then read out. When the last pixel in a line is read out, a vertical shift occurs. Rapid horizontal transfer, pixel readout and vertical line shifting are then repeated until all lines in the image window are read.

The required time to read out two n by n windows from a frame transfer CCD with $N_h$ by $N_h$ active are is given by:

$$T=2N_vT_v+2n(N_h-n)T_h+2n^2T_r+T_{ovh}$$

where $T_v$ and $T_h$ are the required time for vertical and horizontal transfers, $T_r$ is the required time for reading out a pixel, and $T_{ovh}$ is the processing overhead, respectively.

The first term on the RHS is the maximum number of vertical transfers required. The second term on the RHS is the required number of horizontal shifts to read the 2 n image lines, and the third term on the RHS is the time to read out the 2 n by n windows. As an example, a Thomson 7863 CCD with 288×384 pixels image zone, operating with 2 MHz vertical transfer rate, 10 MHz horizontal transfer rate, and 2 MHz pixel readout rate, will require less than 800 μs to readout two 6×6 pixel windows. A faster readout rate can be achieved using a smaller format detector and by increasing the vertical transfer rate. For example, a CCD specially designed for lasercom applications will have a 100×100 pixels active area and greater than 5 MHz vertical transfer rate. Such a device can be read out at greater than 5 kHz update rate.

Figure 3:
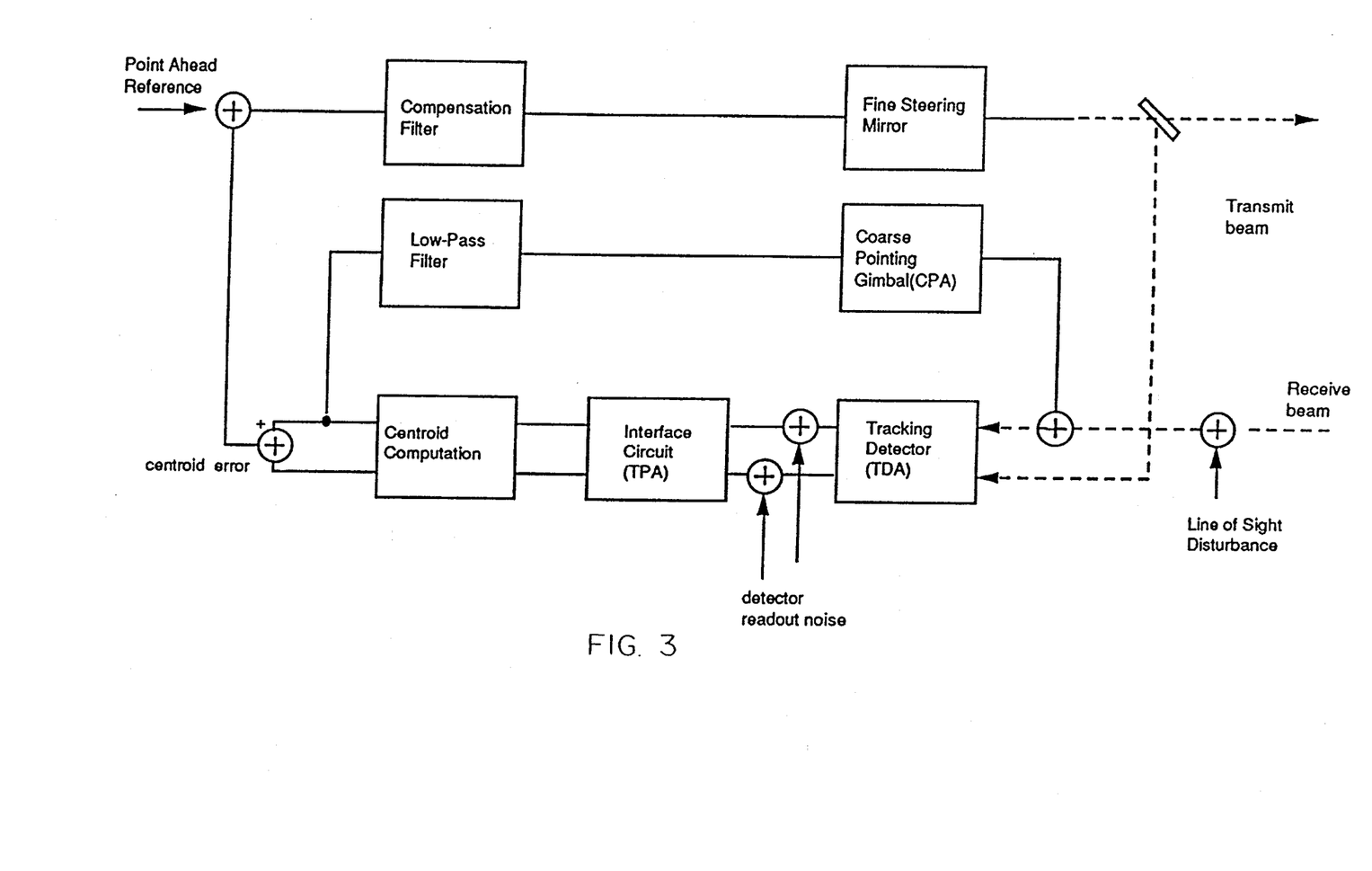
FIG. 3 is a block diagram of a CCD-based tracking control loop used in the invention.

With a discrete time, digital readout device such as the CCD, pointing control can be implemented and analyzed using discrete time control theory. Shown in FIG. 3 is a block diagram of the CCD pointing control loop. The pointing accuracy is influenced by the platform jitter spectrum, the signal-to-noise ratio of the CCD readout and the accuracy of the centroid algorithm. For a digital control system, the effects of noise in the post-digitization circuit are usually negligible.

The disturbance rejection function of the control loop is given by $$H_r(z) = \frac{1}{1+H_c(z)H_m(z)}$$

where $H_c(z)$ and $H_m(z)$ are the discrete time transfer functions of the compensation control and the steering mirror preceded by zero order hold, respectively. The compensation filter, $H_c(z)$, is designed to optimize the disturbance rejection and bandwidth of the control loop in order to achieve high accuracy in the presence of platform jitter.

The main factors limiting the control loop response are the loop delay, the fine steering mirror frequency response and the sampling rate. The loop delay is an important factor as it affects the sampling rate and the phase margin directly. For a given sampling rate, a larger phase margin can be achieved if the processing delay can be minimized. For a given processing delay, raising the sampling rate results in a better frequency response as the cross-over frequency increases. However, the corresponding increase in the required loop gain can cause other undesirable effects when the sampling rate is increased indefinitely. Finally, given the processing delay and the sampling rate, the design of the loop is a function of the mirror resonance frequency. A lower resonance frequency will imply a larger loop gain to maintain the desired cross-over frequency. However, a larger loop gain induces more peak overshoot and a larger noise equivalent bandwidth that may affect the control performance.

The effects of the detector signal-to-noise ratio and the centroiding algorithm can also be evaluated. For a simple centroiding algorithm, the x and y centroids are calculated as $$r_x = \sum_{i=1,j=1}^{n} K_{ij} \cdot i\Delta x / \sum_{i=1,j=1}^{n} K_{ij}$$

$$r_y = \sum_{i=1,j=1}^{n} K_{ij} \cdot j\Delta y / \sum_{i=1,j=1}^{n} K_{ij}$$

where $K_{ij}$ is the detected photoelectrons in the (i,j) pixel, and $\Delta x$, $\Delta y$ are the x, y dimensions of the detector pixel. It has been assumed that the centroiding is performed over the n×n pixel window around the brightest pixel.

Figure 4:
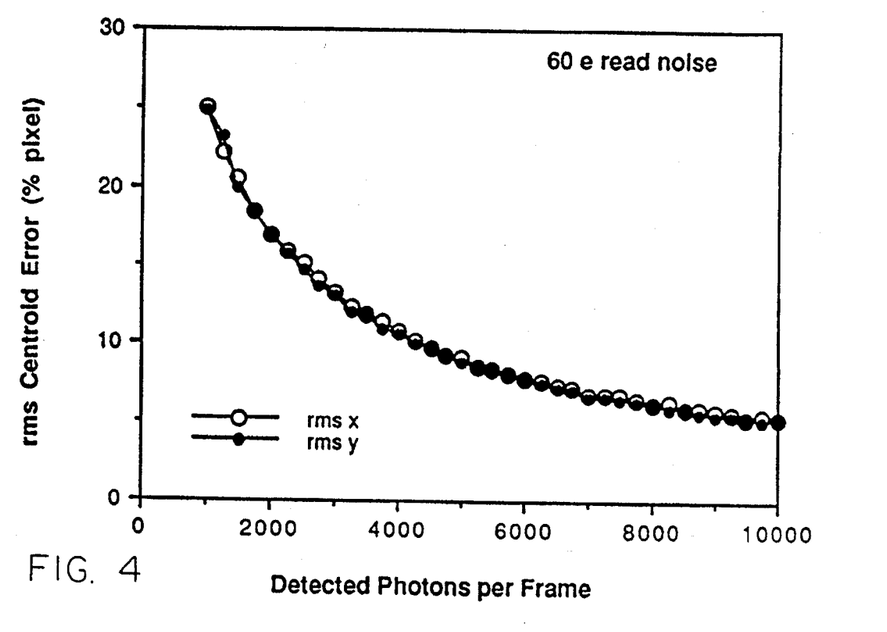
FIG. 4 is a graphical illustration of the root-mean-square centroiding error versus the detected signal photons per frame of a CCD detector used in the invention.

A simple computer program is used to calculate the rms error as a function of the centroid deviation and signal-tonoise ratio. The image spot is modeled to be an Airy disk, and the read noise and shot noise are modeled as Gaussian noise with standard deviation $n_{rms}$. The results of the simulation indicated that the rms error in estimating the centroid location is inversely proportional to the number of signal photons collected by the receiver, and is proportional to the rms readout noise of the detector:

$$\Delta r_{rms} \approx K_o n_{rms}/N$$

where $K_o$ is a constant which is weakly dependent on the image spot size and the actual image location (versus the pixel boundary), and N is the total number of signal photons within the centroiding window. Shown in FIG. 4 is a plot of the rms centroiding error versus the total signal count, N, for a systen with 60 electrons readout noise. The centroid is calculated over a 6×6 window. When the image spot size is ≈2 pixels, the constant $K_o$ is approximately 11.0. The constant is approximately 12.2 when the image spot size is approximately 4 pixels wide. For systems operating with 10,000 detected photoelectrons per frame and an rms noise (shot noise+readout noise) of 200 electrons, the resulting rms error is approximately 0.22 pixels. This translates to an effective shot noise-limited pointing accuracy of 2.2 μrad for a f/20 system with 20 μm pixels.

Figure 5:
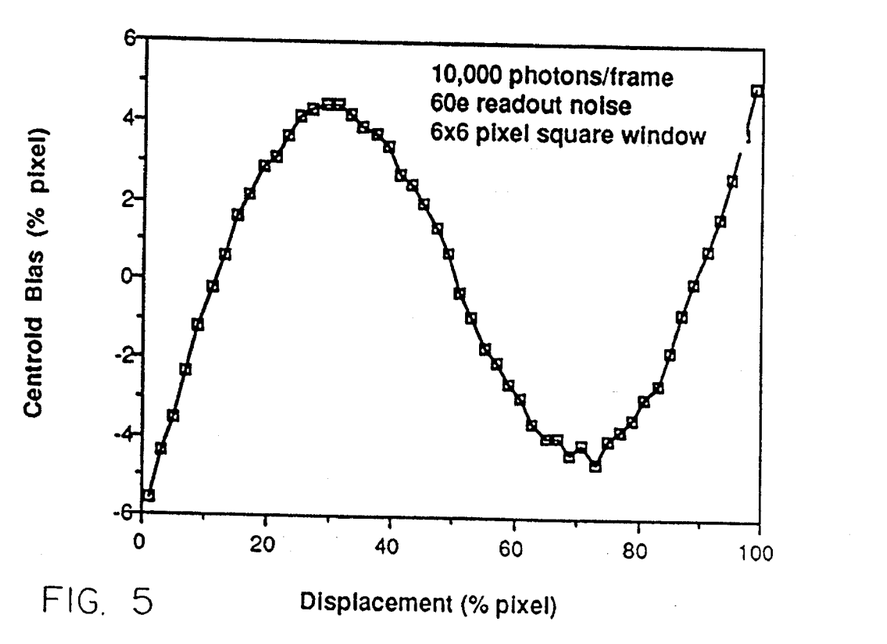
FIG. 5 is a graphical illustration of the centroid bias versus actual pixel translations of the detector referred to in regard to FIG. 4.

In addition to the SNR dependency on the centroid accuracy, there is a position-dependent bias on the calculated centroid. The bias is zero when the image spot falls at the center of four adjacent pixels. The bias grows to approximately 5% of the pixel when the image is translated by ¼ pixel. The bias is not a sensitive function of the SNR and consequently can be calibrated. Shown in FIG. 5 is a plot of the centroid bias versus actual pixel translations.

Figure 6:
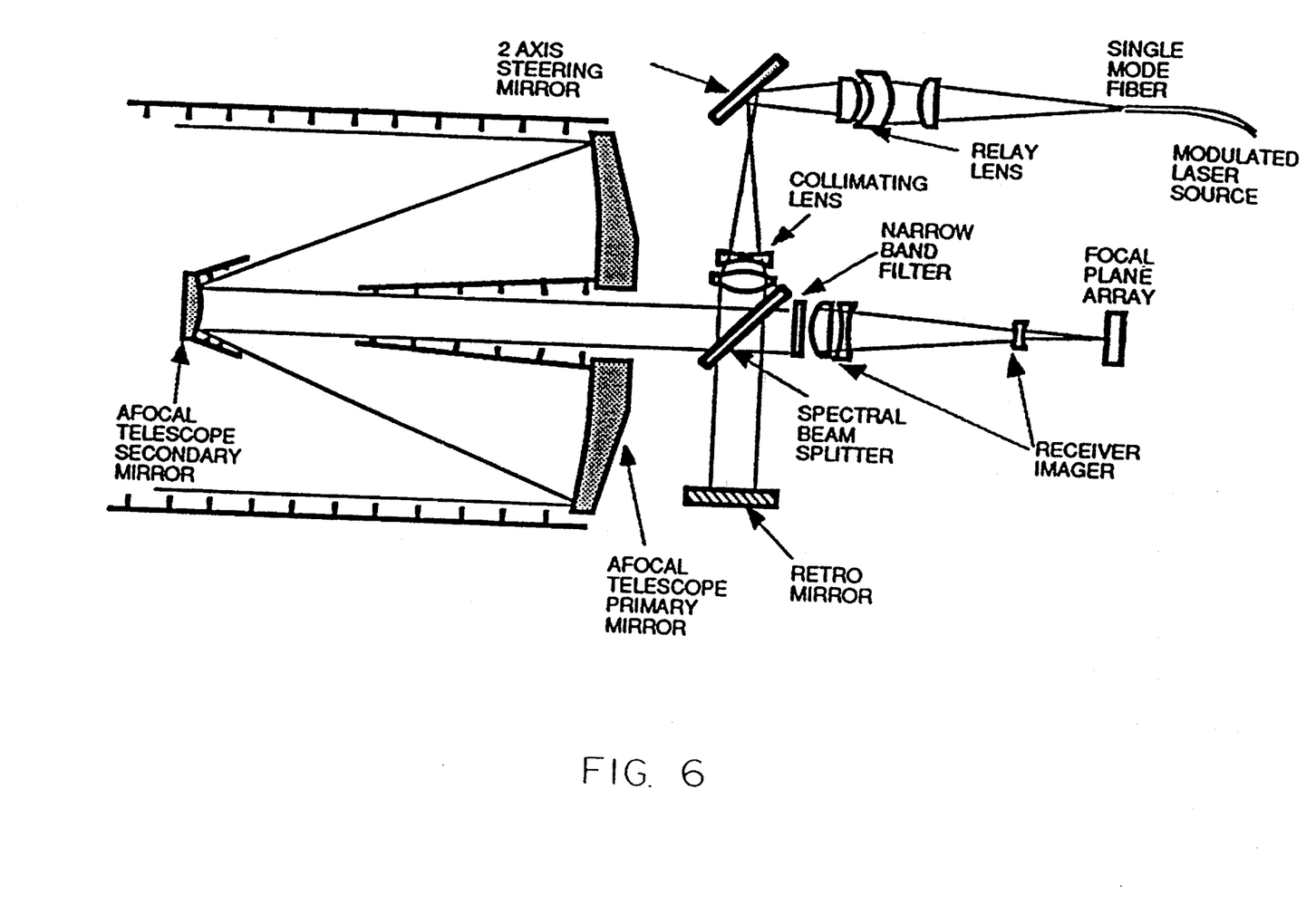
FIG. 6 is a configuration diagram of a CCD-based, high bandwidth, tracking loop used to demonstrate effective jitter compensation in the present invention.

Shown in FIG. 6 is a block diagram of the optical setup of a high bandwidth CCD-based tracking loop used to demonstrate that high bandwidth jitter compensation can be accomplished with the CCD-based tracker of the present invention. The receive optical detector is not implemented, although it is relatively straightforward to include it in the system. Note that only one beam steering mechanism is used to control the transmit-receive point-ahead angle.

For the demonstration, the platform jitter is assumed to exhibit a first order Butterworth spectrum with 1 Hz corner frequency and an rms jitter of 16 μrad. Fine pointing control will be accomplished using the two axis beam steering mirror (TABS-II) from General Scanning. The mirror has a 17 Hz first resonance frequency. Analysis of the pointing control loop indicated that, with a processing delay of 500 μs and a centroid update rate of 2 kHz, arms pointing error of less than 1.2 μrad can be achieved. Furthermore, the control loop will have a gain margin greater than 4 dB and a phase margin greater than 53 degrees.

Analysis of the detector readout time also indicated that the required 2 kHz centroid update rate can be achieved using a commercial CCD (Thomson 7863) with custom readout electronics. The Thomson device has a larger format (576×384 with 288×384 active imaging area) than what is required to cover the field of uncertainty (100×100). Furthermore, the relatively slow vertical transfer rate of the CCD (≈2 MHz) limits the effective centroid update rate even with windowed read. By limiting the active tracking area to the lower 100×100 pixels, however, an effective readout time less than 400 μs can be achieved. The required centroid processing will be accomplished using a dedicated digital signal processor (TI TMS 320C40 DSP) board. The TI DSP has parallel pipelines and can support a maximum of 50 MFLOPs. The detector will be interfaced to the DSP through a gate array logic which controls the detector clock sequencing and keeps track of the pixel coordinates. The DSP will compute the x and y centroids "on the fly" as each pixel is read. The combined DSP/windowed read operation should provide a centroid update rate of 2 kHz to satisfy the design requirement.

SUMMARY

A CCD-based spatial acquisition and tracking subsystem of the present invention can significantly reduce the design complexity of a spaceborne lasercom system. By offering a large field-of-view to cover the initial attitude uncertainty of the host spacecraft, the detector can be used for initial acquisition of the remote beacon. With the use of a windowed read algorithm, the detector can provide a sufficiently high position update rate to track the beacon in the presence of platform jitter. Furthermore, a detector array can permit direct measurement of the transmit-receive pointing offset which can be used to control the point-ahead angle without additional sensors.

Realizing that a lasercom system only needs to stabilize the relative pointing offset between the transmit and receive signals leads to an optical design which requires only one steering mirror for both platform jitter tracking and point-ahead compensation. The reduction in design complexity can lead to reduced system cost and improved system reliability. Furthermore, the invention can permit the implementation of a new generation of lasercom instruments capable of realizing the inherent advantages of optical frequency communication systems.

Having thus described a preferred embodiment of the present invention, what is claimed is:

1. A tracking apparatus for precision beam pointing in a laser communication system, the apparatus comprising:

a telescope for receiving a distant source of reference light and for transmitting modulated laser light, said telescope having an optical axis;

a focal plane detector array positioned to intersect said optical axis;

a beam splitter positioned at said optical axis between said telescope and said focal plane array, said beam splitter being partially transmissive and partially reflective to incident light that is substantially perpendicular to said optical axis;

a retro-mirror positioned on one side of said beam splitter and displaced from said optical axis;

a beam-steering mirror positioned on another side of said beam splitter opposite from said retro-mirror and displaced from said optical axis;

a source of modulated laser light forming a light beam incident on said beam-steering mirror, said light beam being reflected by said beam-steering mirror onto said beam splitter, a first portion of said light beam being reflected by said beam splitter into said telescope for transmission toward said reference light, a second portion of said light beam being transmitted by said beam splitter onto said retro-mirror, being reflected by said retro-mirror back to said beam splitter and being reflected by said beam splitter to said detector array, the distance between an image of said reference light on said focal plane array and an image of said second portion of said light beam on said focal plane array being a direct measure of the relative angular offset between the reference light and the transmitted first portion of said light beam.

2. The tracking apparatus recited in claim 1 wherein said beam-steering mirror is adjustable about each of two orthogonal axes for reducing said angular offset.

3. The tracking apparatus recited in claim 1 wherein said focal plane detector array comprises a plurality of charge coupled devices.

4. The tracking apparatus recited in claim 1 further comprising:

means for sensing said angular offset from said distance between said images on said focal plane array; and means proportional to said distance between said images for controlling said beam-steering mirror for reducing said distance.

5. The tracking apparatus recited in claim 1 wherein said distance between said images is based upon the distance between the centroids of said images.

6. The tracking apparatus recited in claim 1 wherein said detector array comprises an array of CCD's, said CCD array being divided into an image zone for receiving an image of said reference light and of said second portion of said light beam and a storage zone for reading images transferred from said image zone to said storage zone.

7. The tracking apparatus recited in claim 6 further comprising means for using images read from said storage zone at an update rate of at least 2 KHz for adjusting said beam-steering mirror to compensate for platform jitter.

8. A tracking apparatus for precision beam pointing in a laser communication system, the apparatus comprising:

means for receiving a reference light beam from a distant source precisely indicating the desired direction of laser beam transmission from said system;

a modulated laser beam generator;

a detector;

means for controlling the direction of transmission of said laser beam generator;

optical means for directing a first and a second image on said detector, the position of said first image on said detector corresponding to the direction of said reference light and the position of said second image on said detector corresponding to the direction of transmission of said laser beam; and means for measuring the distance between said first and second images and activating said controlling means to reduce said distance to a selected value.

9. The tracking apparatus recited in claim 8 wherein said direction controlling means comprises a beam-steering mirror that is adjustable about each of two orthogonal axes.

10. The tracking apparatus recited in claim 8 wherein said detector comprises an array of charge coupled devices.

11. The tracking apparatus recited in claim 8 wherein said distance between said images is based upon the distance between the centroids of said images.

12. The tracking apparatus recited in claim 10 wherein said CCD array is divided into an image zone for receiving an image of said reference light and of said second portion of said light beam and a storage zone for reading images transferred from said image zone to said storage zone.

13. The tracking apparatus recited in claim 12 further comprising means for using images read from said storage zone at an update rate of at least 2 KHz for adjusting said beam-steering mirror to compensate for platform jitter.

14. A method for precision beam pointing in a laser communication system, the method comprising the steps of:

a) receiving a reference light beam from a distant source precisely indicating the desired direction of laser beam transmission;

b) providing a modulated laser beam and a detector;

c) directing said reference light beam and a portion of said laser beam onto said detector, the relative positions of corresponding images on said detectors corresponding to the angular offset between said laser beam and said reference light beam; and d) altering the direction of said laser light beam to reduce said offset to a selected value.

15. The method recited in claim 14 further comprising the step of updating said detector at a rate sufficiently high to compensate for platform jitter of said modulated laser beam.

\* \* \* \* \*